(No Model.) 3 Sheets—Sheet 1.

R. B. AYRES.
STATION INDICATOR.

No. 467,884. Patented Jan. 26, 1892.

Witnesses:
Edwin L. Bradford
E. Everett Ellis

Inventor
Ruben B. Ayres.
By Wm. C. McIntire
Attorney

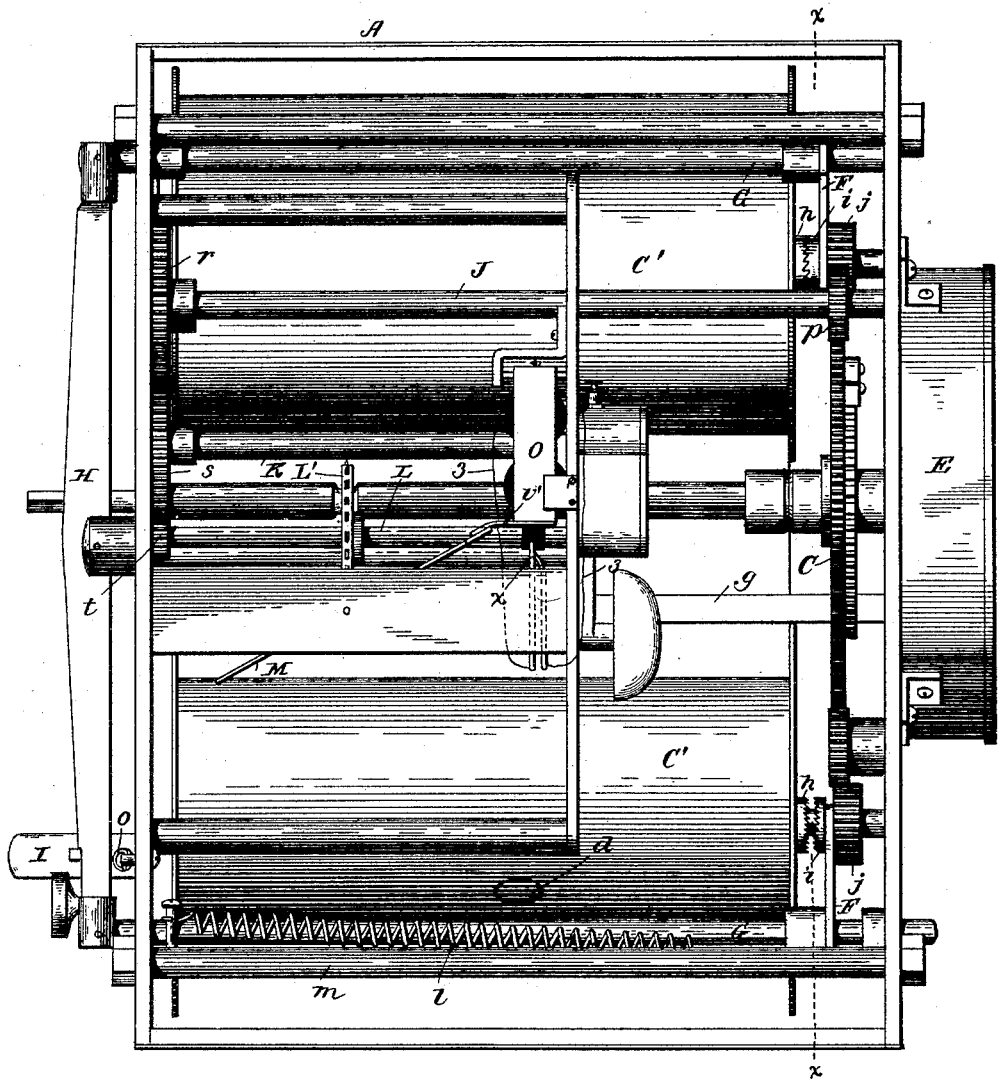

(No Model.) 3 Sheets—Sheet 3.
R. B. AYRES.
STATION INDICATOR.
No. 467,884. Patented Jan. 26, 1892.
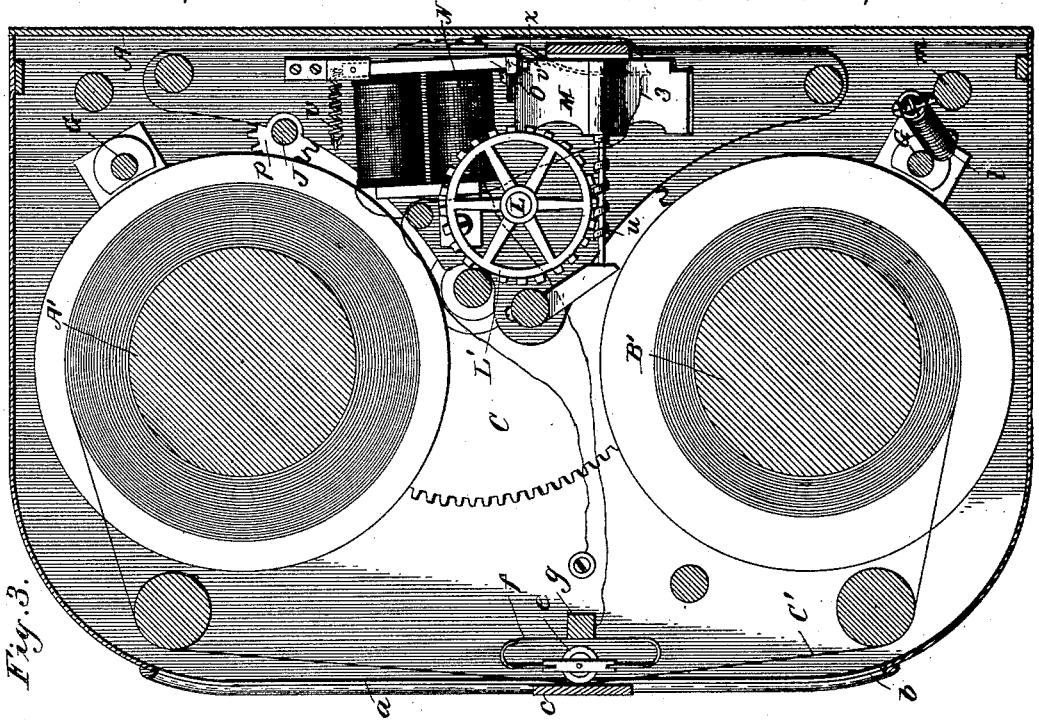
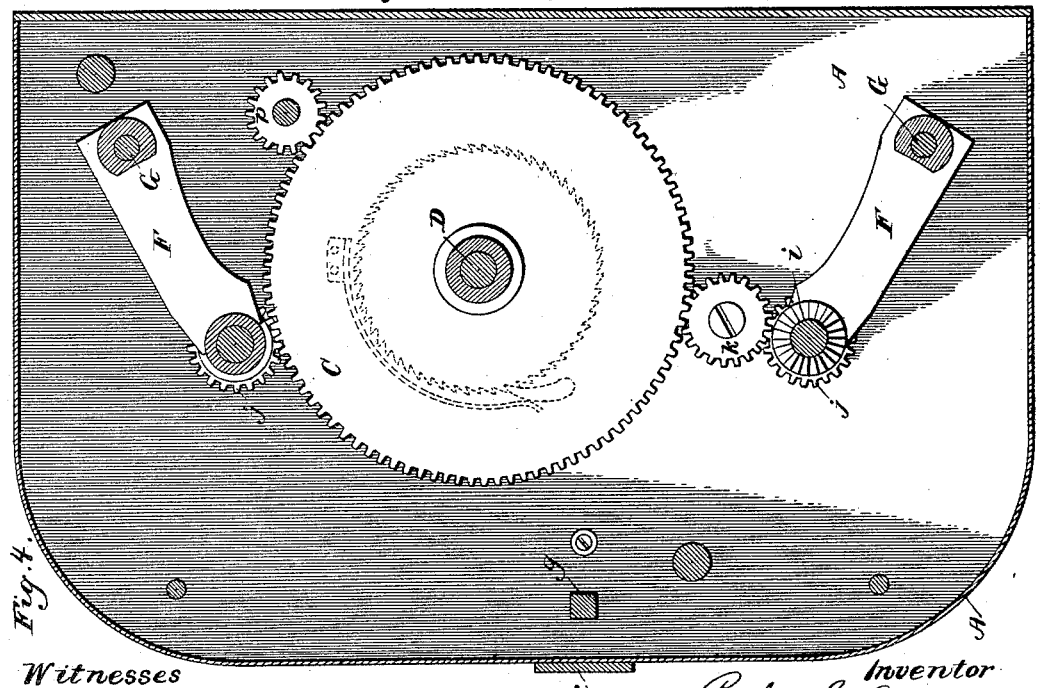

UNITED STATES PATENT OFFICE.

RUBEN B. AYRES, OF NEW YORK, N. Y., ASSIGNOR TO AARON L. AYRES, OF SAME PLACE.

STATION-INDICATOR.

SPECIFICATION forming part of Letters Patent No. 467,884, dated January 26, 1892.

Application filed February 16, 1891. Serial No. 381,577. (No model.)

*To all whom it may concern:*

Be it known that I, RUBEN B. AYRES, a citizen of the United States, residing at New York city, in the county of New York and State of New York, have invented certain new and useful Improvements in Station-Indicators; and I do hereby declare the following to be a full, clear, and exact description of the invention, such as will enable others skilled in the art to which it appertains to make and use the same.

This invention relates to certain new and useful improvements in electrical street or station indicators for railroads; and it consists, substantially, in such novel features thereof as will hereinafter be more particularly described and claimed.

The object of the invention, generically stated, is to provide a street or station indicator for railroads which shall be entirely automatic in its character, and one that shall correctly indicate in successive order the several streets or stations located between the termini of the route over which the car travels or passes, all as will more fully hereinafter appear on reference to the accompanying drawings, in which—

Figure 1:
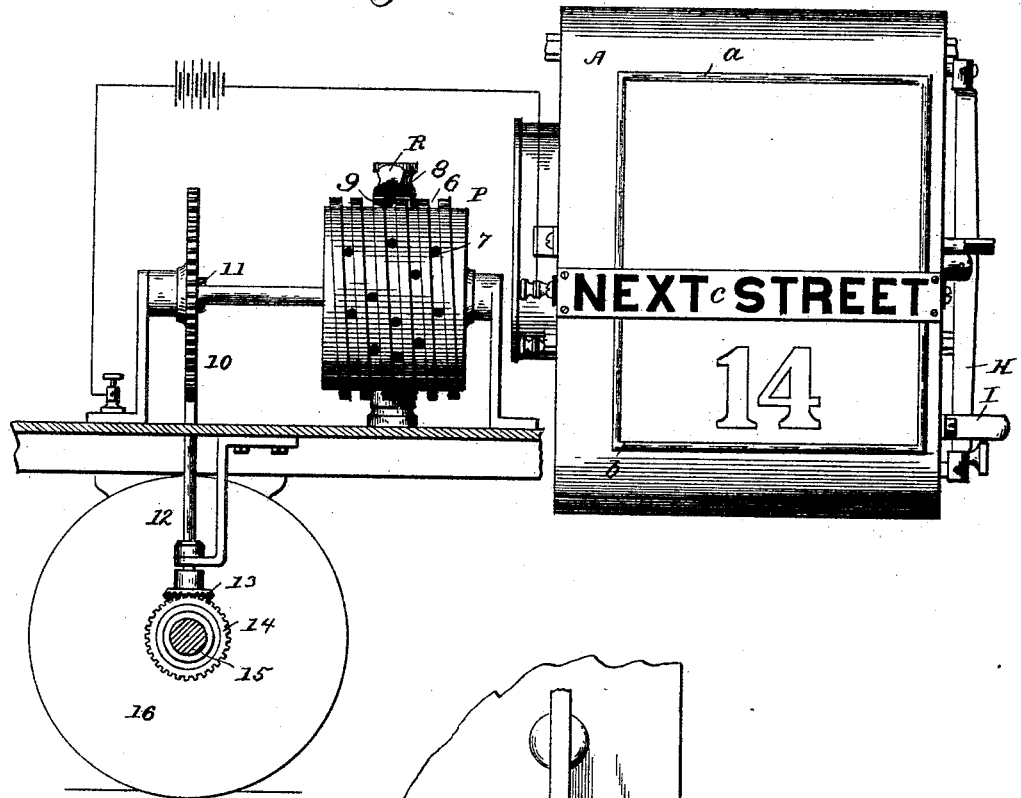
Figure 5:
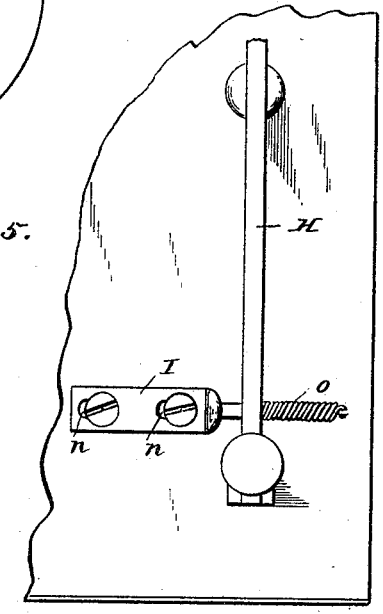

Figure 1 is a vertical front elevation of an electrical street or station indicator in which my improvements are embodied, the said figure representing one kind of means or mechanism by which the indicating mechanism is set into operation at the proper intervals. Fig. 2 is an enlarged view of the internal mechanism or devices taken from the rear side of the machine and having the back removed, so as to more clearly indicate the general construction and arrangement. Fig. 3 is an enlarged side view of the internal mechanism, and partly in section, by which a better understanding will be had of the working of the several parts. Fig. 4 is a sectional view taken on the line $x\ x$ of the casing or housing and representing the shifting-clutch mechanism by which reverse movements are imparted to the revolving drums, so as to enable the stations to be indicated in reverse order without having to rewind the indicating sheet or ribbon from one roller to the other when the end of a line has been reached. Fig. 5 is an enlarged side view in detail representing the lever for operating the clutch devices, as well as the catch or lock for said lever.

In carrying my invention into effect I provide a suitable casing or housing for containing and inclosing the operative indicating mechanism, the said casing being designed to be placed or located within a car in any convenient position. Located between the sides of the casing and having its bearings therein is a revolving main drive-shaft, which is actuated and controlled by means of a spring located on the outer side of the casing, the said shaft carrying near the end thereof adjacent to the spring-drum a large or main gear-wheel, located and arranged within the casing, the said gear meshing with smaller gear mounted on the corresponding ends of the shafts of the drums which move or carry the indicating sheet or ribbon. Instead of using the spring, however, I may of course use any well-known form of electric motor. Said smaller gear-wheels are capable of slight longitudinal movement on the drum-shafts, and they are attached to the ends of two arms which project inwardly from two independent shafts located between the sides of the machine, and these arms also carry at the same ends suitable clutching devices designed to engage similar devices carried by the two drums. In this way, accordingly as either one or the other of the clutches are brought into engagement, the said drums can be operated so as to cause the indicating-ribbon to be moved in one direction or the other. The two independent shafts which carry the clutch-arms are operated by means of a shifting-lever, which is fulcrumed at its center on the outer side of the machine, and which is connected to the ends of said shafts in any suitable manner. A spring locking or retaining device is arranged at the lower end of this lever, and the clutches are thereby held to operative engagement accordingly as the upper or lower set thereof is operated. When the locking or retaining device is released, the lower end of the shifting-lever is maintained in an outward position normally through the medium of a spring located parallel with the lower clutch-shaft and connected thereto, and in this position of the parts the upper clutch will be in engagement and the upper roll be thereby operated to carry the indicating-ribbon backward or reversely after the end of the line or route has been reached; but when it is desired to have the ribbon move forwardly in regular order it is simply necessary to push the lower end of the lever inwardly, thereby releasing the clutch of the upper drum and bringing that of the lower drum into operative connection or play. The said larger or main gear before referred to also meshes with still another small gear which is carried by another independent shaft, and this latter shaft carries at its opposite end an intermediate-sized gear, which in turn meshes with a similar gear carried by a counter-shaft suitably arranged and located within the casing. The counter-shaft referred to has mounted thereon a toothed wheel which works in a worm-shaft arranged transversely to the counter-shaft and having a face or regulator thereon. It is in this way that the speed of the rolls or drums is controlled and the operation of the machine always maintained regular and uniform.

The devices or mechanism which control the movement of both the indicating sheet or ribbon and certain signaling devices, to be hereinafter more specifically referred to, are designed to be set into operation at the proper intervals by electric motive force, and, as one instance in which the same can be carried into effect, I will briefly recite certain means preferably employed therefor.

The front of the casing is left almost entirely open, but is provided with a metallic strip extending across the same, leaving an upper opening or space through which suitable advertisements may be made to appear, and a lower space or opening through which the street or stations are indicated. It is through this strip that electrical connection may be made or broken to cause the ribbon to move and the signal to sound. Attached to a metallic bar behind the strip is a metal spring which carries a small metal roller, while at certain intervals throughout the length of the sheet or ribbon small openings are formed which coincide with the position of the roller. Electrical connections are made between the metallic strip and an electro-magnet situated within the casing to the rear, and from the electro-magnet there are other wire connections leading to a bell or signal located in convenient position. The electro-magnet normally attracts thereto an armature which is pivoted alongside thereof, and while the car is passing from one station to another said armature acts to hold the regulator against movement, as will hereinafter more fully appear; but as the next station is reached the main circuit will be broken, the armature released, and the ribbon operated to move until one of its openings comes before the spring-actuated roller, whereupon the circuit will again become closed, and so on throughout. While the ribbon is moving the distance from one opening or hole to another the short circuit between the electro-magnet and signal-bell will be closed and the said bell operated in an obvious manner.

Any means may be resorted to for establishing electrical communication to the mechanism herein referred to, but preferably I employ such as I will now explain in a general way; but it will be understood that in the present application I lay no claim to such means, since I have made the same the subject of a separate application filed concurrent herewith.

I employ a drum of some conducting material, in which is formed a continuous spiral groove or channel beginning at one end of said drum and extending around the circumference thereof to the other end. Formed in the path of said groove, at such predetermined distances apart as to correspond in scale with the distances between street blocks or stations, are suitable depressions or cavities, which are lined with rubber or other non-conducting material. A lever extends over the drum in any suitable manner and carries at its end a pin, in which is held a small anti-friction roll of conducting material, which enters the groove of said drum.

The drum is operated to rotate slowly through the medium of suitable gearing, so that while the pin is moving over the surfaces between the depressions or cavities a normally-closed circuit will be maintained; but as soon as the cavities are reached the circuit will be broken, the indicating devices operated, and the signal or bell sounded.

Reference being had to the several parts of the drawings by the letters and figures marked thereon, A represents the housing or casing, in which all of the principal indicating devices are located or arranged, the said casing having the upper and lower openings $a$ and $b$ in its front, with a strip $c$ of metal dividing the same.

The letters A' and B' indicate, respectively, an upper and lower roll or drum, around which the indicator sheet or ribbon C' passes, as shown, the said ribbon being formed throughout its its length with a series of small openings $d$, arranged at regular and even distances apart. These openings are for the purpose of enabling electrical contact to take place between the said strip $c$ and the roller $e$, carried by the spring $f$, which is supported by the bar $g$, located behind the strip.

The drums are operated through the medium of a large or main gear-wheel C, carried on one end of a main shaft D, which is controlled and operated by means of any suitable spring or electric mechanism contained within the drum or box E, located to one side of the casing without, as shown. The said drums are each provided at one end, surrounding their axes, with toothed flanges $h$, which are designed to engage similar flanges $i$, formed with or provided on the corresponding sides of the small gears $j$, movably arranged upon the shafts of the drums. The said gears $j$ are attached to the ends of the arms F F, projecting from and supported by the shafts G G, and when the clutch of the upper drum is engaged that drum will be operated to revolve and the ribbon moved upwardly. When the clutch of the lower roll is brought into engagement, the upper clutch will be released, and by virtue of an intermediate gear $k$ working in connection with the lower drum said drum will be caused to revolve in a direction opposite to that followed by the upper drum. In this way the ribbon can be moved in both directions by simply shifting the devices just referred to.

Fulcrumed on the outer side of the casing is a vertical shifting-lever H, the ends of which are in movable connection with the ends of the shafts G G opposite to that on which the clutch-arms F F are held. Normally the lower end of said lever is maintained in an outward position by means of a spring $l$, one end of which is connected to the lower shaft G, while its other end is connected to one of the brace-rods $m$ of the casing, and when in this position the upper drum will be revolved. By forcing the lower end of said lever inwardly, however, the upper drum will be released and the lower one started by reason of change in the position of the clutches. To maintain the lower end of the lever inwardly, I employ a suitable sliding lock or catch I, the same being formed with slots $n$, so as to enable sufficient movement thereof to effect the locking and release of the lever. This catch is controlled by a spring $o$, as shown, and as soon as the lower end of the lever is forced inward the said catch will automatically lock and hold the same.

J represents a shaft arranged in the upper part of the machine, carrying at one end a pinion $p$, meshing with the large or main gear C, while at its opposite end a somewhat larger gear $r$ is carried which meshes with a similar wheel $s$, carried by a shaft K, that is arranged intermediate of the shaft L, which carries the regulator-wheel L'. The said shaft L carries a small pinion $t$, which engages the wheel $s$ in the manner shown.

M represents a speed-regulator, which is carried by a worm-shaft $u$, mounted in suitable bearings in the casing, the said regulator being employed to maintain a uniform speed of the operating-drums.

Located within the casing is an electro-magnet N, which in closed circuit (as is employed in this case) normally attracts thereto a pivoted or swinging armature O; but whenever the circuit is broken the lower end of said armature will be forced outwardly or away from the magnet by means of a spring $v$, which exerts an inward strain or pull upon the upper end thereof. While in the normal position or in closed circuit a spring-lip $v'$, provided on the lower end of the armature, acts to engage one of the vanes or blades of the regulator, and thus prevent the operative devices from moving. It is while in this passive condition of the internal mechanism that the car is supposed to be moving from one street or station to another; but whenever said circuit is opened or becomes broken the armature will be carried away from the magnet, consequently releasing the regulator and permitting the devices to move until the next succeeding opening $d$ in the ribbon or sheet is reached. Whenever one of the openings $d$ registers or comes before the conducting-roller $e$, said roller will form an electrical connection between the casing, and by means of conductors 2 and 3 the circuit will be closed.

Located beneath the armature are two spring-contact points $x$ $x$, which normally stand apart from each other. Just as soon, however, as the lower end of the armature is forced outwardly the said armature strikes these points and forces them together in contact, and in this way while the ribbon is moving to indicate another station the signal-bell will be sounded and the attention of the passengers directed to the machine. The said bell is brought into circuit by means of conductors 3 3. (Shown in the drawings.)

As one means of operating my improved indicator I have shown a drum P of some conducting material and having upon its surface a continuous spiral groove or channel 6, in which is formed at predetermined distances apart suitable cavities or depressions 7, which are lined with rubber or other non-conducting material.

Carried by a movable arm or lever R is a pin 8, in which is held a small roller 9 of conducting material, the said roller being designed to enter the cavities or depressions 7 as they are brought around by movement or rotation of the drum and thereby at intervals open or break the circuit. The said roller is mounted in suitable bearings and is operated to revolve very slowly through the medium of gear-wheel 10, which meshes with a worm-gear 11, carried on the upper end of a vertically-arranged shaft 12. The lower end of said shaft carries a beveled gear-wheel 13, which meshes with a similar wheel 14, mounted on an axle 15, which is supported in bearings supposed to be in the rear of the front car-wheel axle. This axle 15 carries an independent wheel 16, which moves over the surface of the track-rail in a similar manner as the wheels of the car, and it is in this way that the drum P is operated. Suitable wire connections are employed, as shown, as is also an electric battery. Movement of the wheel 16 will be transmitted to the drum through the intermediate mechanism referred to, and while the roller 9 is moving upon the surface of the spiral groove there will be a closed circuit maintained; but just as soon as said roller drops into the cavities or depressions 7 the circuit will be opened or broken, and then the indicator mechanism will be operated in the manner already hereinbefore explained.

Having thus described my invention, what

I claim as new, and desire to secure by Letters Patent, is—

1. In an electrical street or station indicator, the combination, with a metallic case or housing having openings in its front, of a pair of revolving drums, an indicating sheet or ribbon operated by said drums and formed throughout with a series of perforations or openings, a spring-supported contact adapted to project through the openings of the ribbon to form an electrical circuit with the case, clutches for engaging the drums, a shifting-lever for operating the clutches, a locking device for said lever, an electro-magnet and its armature, and a suitable battery and wire connections, substantially as described.

2. In an electrical street or station indicator, the combination, with a metallic case or housing having openings in its front, of the pair of revolving drums, the perforated indicating-sheet operated by the drums, the spring-supported contact operating in conjunction with the case and ribbon to open and close the electric circuit, the clutches and their operating-lever, the spring normally maintaining the lower end of the lever outwardly, a locking device for said lever when the same is shifted inwardly, an electro-magnet and its armature, and a battery and wire connections, substantially as described.

3. In an electrical street or station indicator, the combination, with a metallic case or housing having openings in its front, of a pair of revolving drums, an indicating sheet or ribbon operated by said drums and formed throughout with a series of perforations or openings, a contact adapted to project through said openings to form an electrical circuit with the case, a spring supporting said contact, an electro-magnet and its armature, and a suitable battery and wire connections, substantially as described.

In testimony whereof I affix my signature in presence of two witnesses.

RUBEN B. AYRES.

Witnesses:
E. EVERETT ELLIS,
D. G. STUART.